(12) United States Patent
Surjan et al.

(10) Patent No.: US 6,402,434 B1
(45) Date of Patent: Jun. 11, 2002

(54) METHOD OF APPLYING CHEMICAL ANCHORING ADHESIVE

(75) Inventors: James E. Surjan, St. Charles; Richard J. Ernst, Palatine; Mark S. Timmerman, Elgin; Cyndie S. Hackl, Wauconda; Jeffrey C. Warmolts, Glen Ellyn; Eldridge Presnell, Round Lake Beach, all of IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 09/621,239

(22) Filed: Jul. 26, 2000

(51) Int. Cl.[7] ............................................. E21D 20/02
(52) U.S. Cl. .................................................. 405/259.5
(58) Field of Search .......................... 405/258.1, 259.1, 405/259.5, 259.6; 52/698

(56) References Cited

U.S. PATENT DOCUMENTS

| | | |
|---|---|---|
| 3,494,990 A | 2/1970 | Balint |
| 3,708,379 A | 1/1973 | Flint |
| 3,781,965 A | 1/1974 | Bone |
| 3,837,981 A | 9/1974 | Flint |
| 3,971,117 A | 7/1976 | Osterhout et al. |
| 4,040,471 A | 8/1977 | McCray et al. |
| 4,103,771 A * | 8/1978 | Klatt et al. ............... 405/259.6 |
| 4,286,899 A * | 9/1981 | Benichou et al. ........ 405/259.6 |
| 4,340,637 A | 7/1982 | Koob et al. |
| 4,516,884 A * | 5/1985 | Douty ..................... 405/259.6 |
| 4,560,902 A | 12/1985 | Kardon |
| 5,027,981 A | 7/1991 | Magister |
| 5,129,977 A | 7/1992 | Leatherman |
| 5,229,438 A * | 7/1993 | Ishida et al. |
| 5,352,308 A | 10/1994 | Tomihara et al. |
| 5,447,593 A | 9/1995 | Tanaka et al. |
| 5,486,096 A | 1/1996 | Hertel et al. |
| 5,544,981 A | 8/1996 | Nishida et al. |
| 5,554,240 A | 9/1996 | Toy |
| 5,730,557 A | 3/1998 | Skupien et al. |
| 5,731,366 A | 3/1998 | Moench et al. |
| 5,953,879 A | 9/1999 | Fischer et al. |

FOREIGN PATENT DOCUMENTS

| | | |
|---|---|---|
| AU | 48487/97 | 6/1998 |
| BE | 754232 | 5/1971 |
| BE | 784024 | 4/1972 |

(List continued on next page.)

OTHER PUBLICATIONS

*Technical Guide Supplement HILTI HVA Adhesive Anchoring System*(11 pages), Hilti, Inc. 1997.

(List continued on next page.)

*Primary Examiner*—H. Shackelford
*Assistant Examiner*—John Kreck
(74) *Attorney, Agent, or Firm*—Pauley Petersen Kinne & Erickson

(57) ABSTRACT

A method of applying a chemical anchoring adhesive to the interior of a borehole includes the steps of providing a highly viscous, self-contained slug of chemical anchoring adhesive, inserting the slug into the borehole, providing an anchor pin, and driving the anchor pin into the borehole using a driving tool that imparts rotary motion to the anchor pin. The adhesive slug includes a first part having a first color and including a resin, and a second part having a second color different from the first and including a curing agent. The rotary motion of the anchor pin mixes the first and second parts together to form a substantially homogeneous composition having a third color different from the first and second colors. The visual indication provided by the third color notifies the worker when the mixing is complete, saving time and money at the construction site while minimizing the occurrence of defective or insufficient mixing.

23 Claims, 2 Drawing Sheets

FOREIGN PATENT DOCUMENTS

| | | |
|---|---|---|
| BE | 815338 | 9/1975 |
| BE | 830102 | 10/1975 |
| BE | 830269 | 10/1975 |
| BE | 840460 | 8/1976 |
| BE | 855086 | 9/1977 |
| DE | 2012908 | 4/1971 |
| DE | 1603819 | 8/1975 |
| DE | 2423410 | 11/1975 |
| DE | 2925508 | 1/1981 |
| DE | 3518277 | 4/1986 |
| DE | 4136145 | 5/1993 |
| DE | 4141990 | 6/1993 |
| DE | 29610947 | 8/1996 |
| DE | 197 34 302 | 2/1999 |
| DE | 197 36 850 | 2/1999 |
| DE | 197 39 764 | 3/1999 |
| EP | 144039 | 6/1985 |
| EP | 849 345 | 6/1998 |
| FR | 1593972 | 4/1970 |
| FR | 2015848 | 2/1971 |
| FR | 2073549 | 1/1972 |
| GB | 1344741 | 1/1974 |
| GB | 1346674 | 2/1974 |
| GB | 1381276 | 1/1975 |
| WO | 98/55772 | 12/1998 |

OTHER PUBLICATIONS

*Shell Resins*, EPON® RESIN 828 specification sheet, Shell Oil Co., undated.

*Epoxy Curing Agents and Diluents*, ANCAMINE® 1856 Curing Agent specification sheet, Air Products and Chemicals, Inc., undated.

*Epoxy Curing Agents and Modifiers*, ANCAMINE® K54 Curing Agent specification sheet, Air Products and Chemicals, Inc., Feb. 1998.

*Epoxy Curing Agents*, ANCAMINE® 1767 Curing Agent specification sheet, Air Products and Chemicals, Inc., Nov. 1997.

*Epoxy Curing Agents*, specification sheets (5 pages), Air Products and Chemicals, Inc., undated.

*Acceptance Criteria For Adhesive Anchors In Concrete And Masonry Elements*, International Conference of Building Officials, 1–11, Jan. 1999.

*Iron and Steel*, Textbook, Section 6, pp. 17–30, undated.

\* cited by examiner

METHOD OF APPLYING CHEMICAL ANCHORING ADHESIVE

FIELD OF THE INVENTION

This invention is directed to an improved method of applying a chemical anchoring adhesive into a borehole. The chemical anchoring adhesive is provided in the form of a highly viscous, self-contained rope or slug having a first resin-containing part and a second curing agent-containing part joined along an interface. The slug is sized to the depth of the borehole and manually inserted into the borehole. The rope is cut to yield a slug of desired size before or after insertion into a borehole. The first part and second part have two different colors which mix to yield a third color when subjected to the turning force of a driving tool.

BACKGROUND OF THE INVENTION

Chemical anchoring adhesives are known which are composed of two or more components that react together and cure when mixed. U.S. Pat. No. 5,730,557, issued to Skupian et al., discloses a mortar mixture capsule unit for chemical attachment of anchors in boreholes. The capsule houses a filler material, and a chemical binder system contained in smaller capsules within the filler material. The cartridge is inserted into a borehole, and a driving tool is used to insert an anchor. The driving tool imparts motion to the anchor, which ruptures both the housing capsule and the smaller capsules contained within it, causing the chemical binder system to interact and mix with the filler. The interaction and mixing causes reaction and curing of the binder system/filler mixture, thereby securing the anchor within the borehole. A similar adhesive is sold by Hilti AG under the trade name "HVU".

U.S. Pat. No. 5,731,366, issued to Moench et al., discloses a chemical plugging compound based on a free-radically polymerizable resin and a free-radical initiator spatially separated therefrom. The spatial separation can be effected by encapsulating the initiator in glass, gelatin or cellulose capsules. The plugging compound is described as being self-supporting and storage stable.

These and other prior art chemical anchoring adhesives and methods have certain disadvantages. One disadvantage is that one or both components are fluid, and must be wrapped, encapsulated or otherwise enclosed in a package prior to use. Thus, it is often not easy to vary the amount of adhesive used in a borehole, or the size of the housing capsule, while at the job site. Put another way, oversized and undersized boreholes often receive the same amount of predetermined, pre-packaged adhesive as boreholes of standard size.

Another disadvantage is that fluid adhesives may flow or spill from the boreholes during use, particularly after the package is ruptured by the anchor being driven. This problem is especially acute when the borehole is upside down and vertical, but also exists when the borehole is horizontal, or at an angle between horizontal and upside down vertical. Even when the adhesive is not completely fluid, the shapes of the prior art cartridges are typically not self-retentive, i.e., the cartridges will fall from overhead boreholes.

Another disadvantage is that the two components, binder and filler, must be completely segregated prior to use, to prevent premature interaction and reaction. The encapsulation techniques used to accomplish this require some precision and expense. Also, there is no assurance that the smaller capsules used to contain the binder will remain evenly dispersed among the filler until the adhesive capsule is used. Uneven dispersion of the binder and filler can lead to uneven or inadequate adhesion of the anchor.

Cartridge adhesives are another type of prior art adhesive. Cartridge adhesives include two separate parts which are simultaneously injected into a borehole using a two-barrel caulking gun which brings the two parts together at the point of injection, whereupon they react upon entering the borehole. Disadvantages of cartridge adhesives and methods include excessive packaging waste, excessive adhesive waste due to unmixed, unused material remaining in the caulking barrels, and insufficient viscosity, which permits the material to run out of vertical overhead boreholes, and to sag in horizontal boreholes.

SUMMARY OF THE INVENTION

The present invention is directed to a method of applying a chemical anchoring adhesive to the interior of a borehole. The method includes the steps of providing a chemical anchoring adhesive in the form of a highly viscous, self-contained slug whose length is selected based on the depth of the borehole, inserting the slug into the borehole, providing an anchor pin, and driving the anchor pin into the borehole using a driving tool that imparts rotary motion to the pin. The adhesive slug includes a first part having a first color, and a second part having a second color different from the first. The first part includes a resin, and the second part includes a curing agent. The rotational motion of the anchor pin mixes the first and second parts together, resulting in formation of a substantially homogeneous mixture having a third color different from the first and second colors. The appearance of the third color, and disappearance of the first and second colors, indicates that the mixing is complete.

The adhesive composition may be produced in the form of a rope, which can be cut into slugs of the desired length either before the slugs are inserted into a borehole, or after a rope end is inserted into a borehole. The weight ratio of the first and second parts is substantially consistent along the entire length of the slug, to ensure formation of a substantially homogeneous cured composition upon mixing. Thus, the adhesive composition is both self-measuring and self-retaining due to its shape, viscosity and axial homogeneity.

With the foregoing in mind, it is a feature and advantage of the invention to provide a method of applying an anchoring adhesive into a borehole which yields a high strength bond and a substantially homogeneous cured composition.

It is also a feature and advantage of the invention to provide a method of applying an adhesive composition into a borehole which does not result in spilling of adhesive from overhead or horizontal boreholes, before or during mixing.

It is also a feature and advantage of the invention to provide a method for applying an adhesive composition into a borehole which includes the use of a color indicator to advise a worker when the mixing of the two adhesive parts is complete.

The foregoing and other features and advantages will become further apparent from the following detailed description of the presently preferred embodiments, read in conjunction with the accompanying drawings and examples. The detailed description, drawings and examples are illustrative rather than limiting, the scope of the invention being defined by the appended claims and equivalents thereof.

DETAILED DESCRIPTION OF THE PRESENTLY PREFERRED EMBODIMENTS

Figure 1:
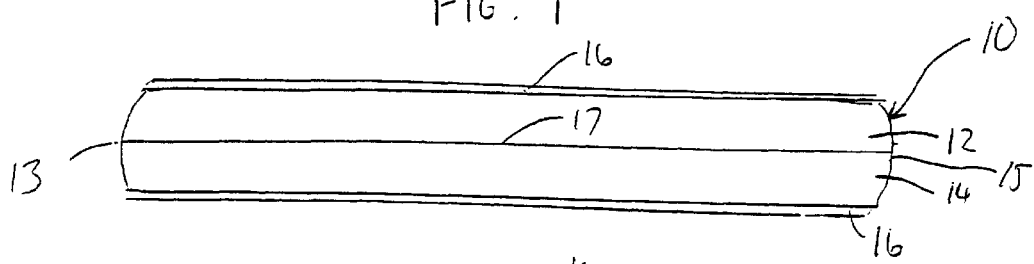
FIG. 1 illustrates a segment or slug of the highly viscous, essentially solid anchoring adhesive used in the method of the invention, prior to insertion into a borehole.
Figure 2:
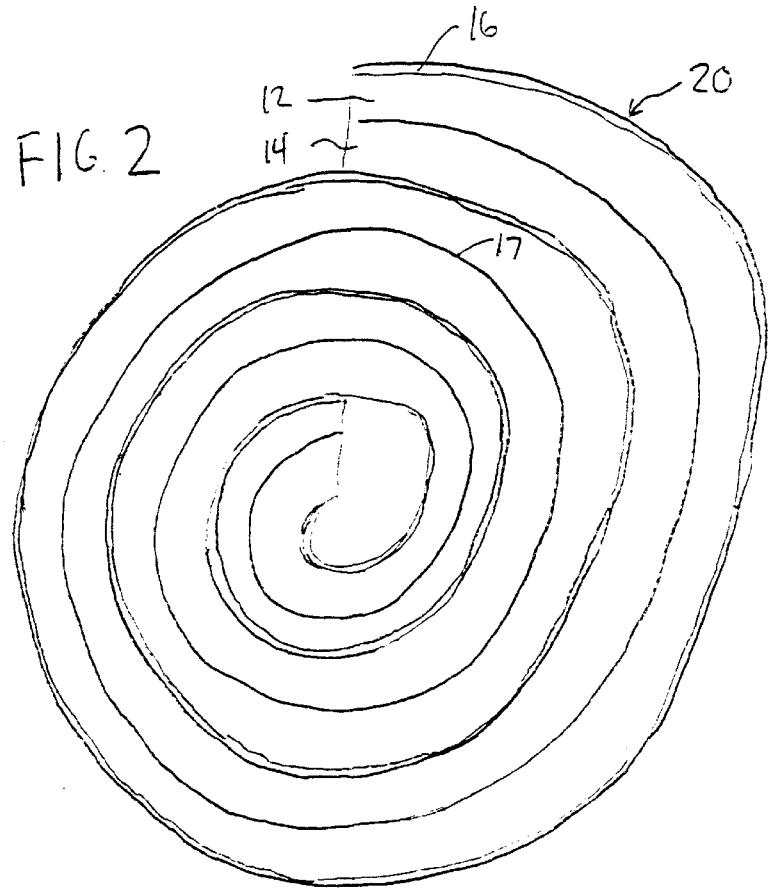
FIG. 2 illustrates the highly viscous adhesive composition, prior to cutting into slugs, wound up into a coiled rope.

The present invention is directed to a method of applying a chemical anchoring adhesive to the interior of a borehole, and using it to secure an anchor pin within the borehole. Referring to FIGS. 1 and 2, the method includes the step of providing the chemical anchoring adhesive in the form of a slug 10, or in the form of a rope 20 from which slugs 10 can be cut. The rope 20 may be wound up into a coil during storage, and may be unwound as it is used. Rope 20 (or slug 10) of adhesive includes a first part 12, which includes a resin component, and a second part 14, which includes a curing agent, joined together and touching each other along an interface 17. The rope 20 (or slug 10) may be wrapped around its circumference with a clear wrapper 16.

Figure 4A:
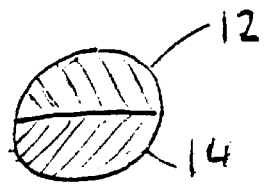
FIGS. 4(a)–4(i) illustrate, in cross-section, a wide variety of extruded configurations for the two parts of the adhesive composition used in the method of the invention.
Figure 4B:
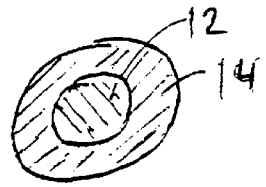
Figure 4C:
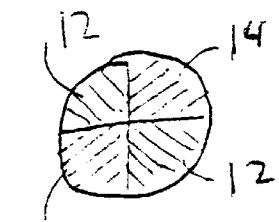
Figure 4H:
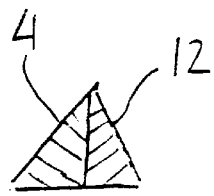
Figure 4D:
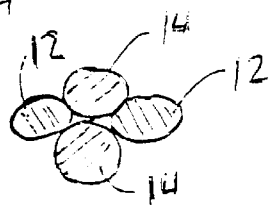
Figure 4I:
Figure 4E:
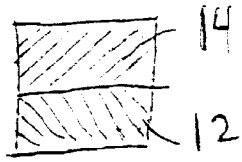
Figure 4F:
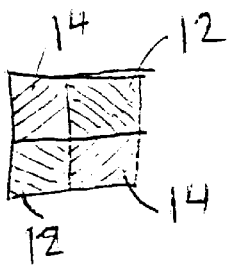
Figure 4G:
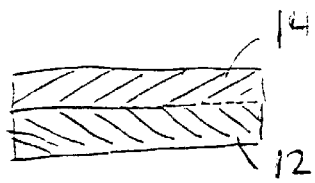

The rope 20 (or slug 10) may have a cylindrical or elliptical cross-section as shown in FIGS. 4(a) through 4(c) (with that of FIG. 4(a) being preferred), a threaded cross-section including a plurality of adjacent filaments as shown in FIG. 4(d), a square or rectangular cross-section as shown in FIGS. 4(e) through 4(g), a triangular cross-section as shown in FIG. 4(h), a curled cross-section as shown in FIG. 4(i), or any other suitable configuration. The preferred cross-sectional shape may depend, to some extent, on the shape of the borehole into which it is inserted. Also, the shape can be selected to facilitate self-retention of the rope 20 (or slug 10) in a borehole, particularly an overhead borehole.

The rope 20 (or slug 10) has a shape and composition which are substantially consistent and uniform along its entire length. This means that the cross-sectional shape as shown in any of FIGS. 4(a)–4(i), and weight ratio of the first part 12 and second part 14, are substantially consistent and unchanged along the length of rope 20 (or slug 10). The interface 17 between first part 12 and second part 14 extends the length of the rope 20 (or slug 10). The adhesive rope or slug should contain about 20–80% by weight of each of the first and second parts 12 and 14, based on the combined weight of the first part 12 and the second part 14. Preferably, the rope or slug contains about 35–75% by weight of the first part 12 and about 25–65% by weight of the second part 14, more preferably about 52–65% by weight of the first part 12 and about 35–48% by weight of the second part 14, most preferably about 57% by weight of the first part 12 and about 43% by weight of the second part 14. The rope or slug is surrounded on its side by a wrapper 16 which may be a plastic film, foil, paper or the like, and is preferably a polyethylene or polypropylene film.

The first part 12 of the adhesive composition has a first color. The first color may be a natural color resulting from the combined ingredients, or an imparted color resulting from the addition of a minor quantity of dye, pigment, or the like. The second part 14 of the adhesive composition has a second color, which is different from the first color. The second color may be a natural color resulting from the combined ingredients in the second part, or an imparted color resulting from the addition of dye, pigment, or the like. The second color should be sufficiently different from the first color that the interface 17 between the first and second parts 12 and 14 is detectable by the naked eye.

When the first and second parts 12 and 14 are mixed together in a borehole, resulting in a curing reaction, the first and second colors disappear, and are replaced by a third color. The third color may result from the blending of the first and second colors, from a chemical reaction, or both. The third color should be sufficiently different from both the first and second colors that the appearance of the third color to replace the first and second colors is detectable by the naked eye.

Figure 3:
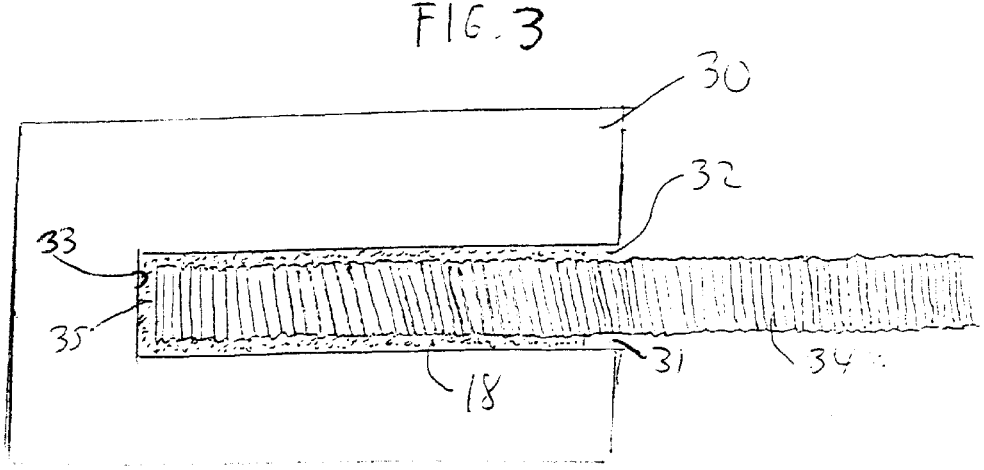
FIG. 3 illustrates a borehole, and an anchoring pin held into the borehole, following use of the highly viscous adhesive composition.

The rope 20 of adhesive composition may be cut to any desired length to provide slugs 10, each having ends 13 and 15 as shown in FIG. 1. This cutting may occur away from or at the construction site, so as to form slugs 10 of different lengths corresponding to varying depths of boreholes. Referring to FIG. 3, for instance, rope 20 may be inserted into borehole 32 in structure 30 as far as possible, and then cut at the entrance of the borehole leaving a slug 10 whose length substantially corresponds to the depth of the borehole. Alternatively, a precut slug 10 may be inserted into the borehole. Referring to FIGS. 4(a)–4(i), the end of a slug 10 of any shape may be pinched, causing the end to flatten out and widen. This end pinching may facilitate the self-retention and anchoring of an adhesive slug 10 in a borehole. The cutting of the rope into slugs may inherently cause this pinching. Much of the anchoring results when some of the adhesive smears against the wall of the borehole during insertion.

A driving tool (not shown) is then used to drive an anchor pin 34 into the borehole 32. A typical anchor pin 34 may be threaded, and may have a flat or pointed forward end 35. A typical driving tool uses rapid rotational motion to spin the anchor pin into the borehole. The driving tool may operate at about 500–3000 rpm, suitably about 1000–2500 rpm, desirably about 1400–2000 rpm. Some driving tools employ a combination of hammering (axial motion) and rotational motion. In one embodiment, a slug 10 may be physically attached to the end of a driving tool, and inserted into the borehole during use of the driving tool.

The movement of the driving tool, and consequent motion of the anchor pin 34, causes disintegration of the wrapper 16 and mixing of the first part 12 and second part 14 of adhesive slug 10, within the borehole. The wrapper 16 shreds and mixes with the adhesive parts and, to some extent, may aid in the mixing. The threads on the anchor pin 34 aid in the mixing. As the anchor pin 34 is driven into the borehole 32, the entire adhesive slug 10 is blended into a substantially homogeneous mixture 18 which fills most of the spaces between anchor pin 34 and the inner walls of borehole 32. The mixing action also causes substantial curing of the mixture 18 to firmly secure the anchor pin 34 within borehole 32.

In a typical situation, the homogenization of the adhesive composition resulting from the mixing occurs first at the deepest end 33 of the borehole 32, and then progresses outward along the threaded anchor pin 34 until reaching the entrance 31. Put another way, the adhesive composition near the entrance 31 is the last to homogenize. Thus, for a worker driving the anchor pin 34 into the borehole, a color change of the adhesive composition at the entrance 31 to the third color, serves as a reliable visual indication that the adhesive composition has been thoroughly mixed. This saves time and money because, without such a visual indication, a worker would be compelled to drive the anchor pin for a longer period than is necessary, just to make sure that the adhesive is completely mixed. Alternatively, the worker may unknowingly drive the anchor pin for too little time to mix the adhesive, resulting in incomplete cure and defective anchoring.

The first part 12 of the adhesive rope or slug has a viscosity of about 5 million to about 50 million centipoise at 25° C., preferably about 20 million to about 45 million centipoise, more preferably about 30 million to about 40 million centipoise. The viscosity can be measured using a Brookfield Viscometer, Model DV-3, made by Brookfield Engineering Co., using the procedure set forth in the manufacturer's instructions. The second part 14 of the adhesive rope or slug has a viscosity of about 5 million to about 50 million centipoise at 25° C., preferably about 20 million to about 45 million centipoise, more preferably about 30 million to about 40 million centipoise. The foregoing viscosities ensure that the first and second parts 12 and 14 essentially have a solid phase, putty-like consistency, allowing the adhesive rope 20 to be cut into slugs 10, compressed, or otherwise deformed at will, but preventing flowing, spilling and other random deformation of the adhesive composition.

To facilitate manufacturing of the two-part adhesive rope 20, and later mixing of the two parts in a borehole, the viscosities of the two parts 12 and 14 should be close to each other, and are preferably substantially matched. Generally, the viscosity of the second part 14 should be no more than 30% higher or 30% lower than the viscosity of the first part 12. Preferably, the viscosity of the second part 14 is no more than 20% higher or 20% lower than the viscosity of the first part 12. More preferably, the viscosity of the second part 14 is no more than 10% higher or 10% lower than the viscosity of the first part 12. Most preferably, the two viscosities are substantially the same.

In one embodiment, the first part 12 of the adhesive includes about 20–45% by weight of an epoxy resin, about 10–40% by weight of a first particulate filler, and about 40–65% by weight of a second particulate filler. Preferably, the first part 12 of the adhesive includes about 25–35% by weight of the epoxy resin, about 12–25% by weight of the first particulate filler, and about 45–60% by weight of the second particulate filler. More preferably, the first part 12 of the adhesive includes about 26–30% by weight of the epoxy resin, about 16–20% by weight of the first particulate filler, and about 52–58% by weight of the second particulate filler.

The epoxy resin is preferably a liquid epoxy derivative. Novolac epoxy resins are particularly suitable, and bisphenol epoxy resins are preferred. One particularly suitable bisphenol epoxy resin is available from Shell Chemical Co. under the trade name EPON®828. EPON®828 is a difunctional bisphenol A/epichlorohydrin derived from liquid epoxy. Other suitable epoxy resins include ARALDITE®610, available from Ciba-Geigy; and DER 331, available from Dow Chemical Co.

The first particulate filler should have an oil absorption value of at least about 30, measured using ASTM D281-31. Preferably, the first particulate filler has an oil absorption of at least about 40, more preferably at least about 50. One suitable first filler is talc, having a particle size of about 1 micron to about 50 microns. One suitable talc filler is Talc 399 sold by the Whitaker, Clark & Daniels Corporation. Other suitable talcs are Mistron ZSC from Cyprus Minerals, and MP12–50 from Pfizer Chemical Co. Other suitable first particulate fillers, having similar particle size ranges, include calcium carbonate, glass beads, silica, fly ash, clay, and the like. These other fillers are less desirable than talc.

The second particulate filler is different from the first, and can be defined in terms of U.S. Sieve size. At least about 70% by weight of the filler particles should have a U.S. Sieve size between 16 and 45, inclusive. Preferably, at least about 80% by weight of the filler particles, and more preferably at least about 90% by weight of the filler particles, have a U.S. Sieve size between 16 and 45. Particulate filler within this size range facilitates optimum extrusion during manufacturing, excellent mixing of the adhesive during use due to action of a driving tool, shredding of the wrapper 16 during mixing, and excellent bond strength of the cured adhesive. Filler having significant amounts of larger (lower U.S. Sieve size) particles provides good in-hole mixing and wrapper shredding, but causes extrusion and/or forming difficulties during manufacture of the adhesive rope. Filler having significant amounts of smaller particles (higher U.S. Sieve size) provides excellent extrusion and/or forming during manufacture of the adhesive, but facilitates poor in-hole mixing, wrapper shredding and bond strength of the adhesive.

Suitable second fillers contributing to in-hole mixing of Parts A and B include silica sand, glass beads, and quartz. One particularly suitable filler is a sand, for example, a silica sand sold as AGSCO® Sand No. 1, by the Agsco Company. For this sand, about 89.4% by weight of the particles have a U.S. Sieve size between 16 and 45.

In the one embodiment, the second part 14 of the adhesive includes about 5–20% by weight of an amine compound, meaning an amine or chemical derivative thereof but not a tertiary amine, about 0.1–15% by weight of a tertiary amine compound, meaning a tertiary amine or chemical derivative thereof, about 1–23% by weight of a first particulate filler and about 52–87% by weight of a second particulate filler. Preferably, the second part 14 includes about 10–18% by weight of the amine compound, about 1–10% by weight of the tertiary amine compound, about 5–18% by weight of the first particulate filler and about 58–72% by weight of the second particulate filler. More preferably, the second part 14 includes about 12–16% by weight of the amine compound, about 1–5% by weight of the tertiary amine compound, about 7–12% by weight of the first particulate filler, and about 62–68% by weight of the second particulate filler.

The first and second fillers in the second part 14 are selected from the same groups of fillers as the first and second fillers in the first part 12 of the adhesive composition, and may or may not be identical to the first and second fillers in the first part 12. The amine compound acts as a curing agent once the first part 12 and second part 14 have been mixed together. The tertiary amine compound acts as an accelerator for the curing reaction.

Suitable amine compounds include amines, aliphatic amines, aminoethylpiperazine, amido amines, cycloaliphatic amines, and the like. Preferred aliphatic amines include Mannich bases. One suitable Mannich base is sold by Air Products Co. under the name ANCAMINE®1856. Other suitable aliphatic amines include ANCAMINE®1767 and ANCAMINE®1768.

Suitable tertiary amine compounds include ANCAMINE®110, ANCAMINE®K61B, and ANCAMINE®K54, all sold by Air Products Co., and EPI-CURE®3253 sold by Shell Chemical Co. A preferred tertiary amine is sold by Air Products Co. under the trade name ANCAMINE®K54, and is a tris-(dimethylaminomethyl) phenol.

To manufacture the adhesive rope 20, the ingredients of the first part 12 can be mixed in a first mixer, and the ingredients of the second part 14 can be mixed in a second mixer. The separate mixers can be drum tumblers, sigma blade mixers, planetary mixers, extrusion mixers, press mixers, and the like. Vigorous mixing, requiring shear without added heat, may be employed to ensure a homogenous distribution of ingredients in each of the first part 12 and the second part 14. The first part 12 and second part 14 may then be extruded and/or pressed adjacent to each other, using separate extruders and/or presses that converge in a single die, to form the biconstituent adhesive rope shown in FIG. 2, having the interface 17 between first part 12 and second part 14. Once the adhesive rope has been formed, it may be covered with wrapper 16 which, as explained above, can be made of plastic, foil, paper or the like, but is preferably made of a polyolefin such as polyethylene or polypropylene. After being stored as a coiled rope as shown in FIG. 2, the adhesive rope can be cut or sheared into individual slugs 10, having any desired sizes, either at the construction site or before entering the construction site.

EXAMPLES

A highly viscous, essentially solid phase adhesive rope having the configuration shown in FIGS. 2 and 4(*a*) was prepared, using the following compositions for the first part and the second part, and a weight ratio of 4:3 for the first and second parts. The reason for having more of the first part than the second part is to maintain about 5% less than a stoichiometric balance of hardener in the second part to resin in the first part. Unreacted hardener may facilitate creep of the anchoring adhesive, and the amount of unreacted hardener is minimized by this technique. The first part had a viscosity of 40 million centipoise. The second part had a viscosity of 40 million centipoise. The composition was extruded into a rope having a 0.5-inch diameter. The extruded rope was wrapped in high density polyethylene film having a thickness of 0.5 mil, and was cut into slugs having a length of 4.5 inches.

| First Part (Resin) | |
|---|---|
| Material | % By Weight |
| EPON ® 828 (Bisphenol A Epoxy Resin) | 28.00 |
| Talc 399 (Whitaker, Clark & Daniels) | 17.30 |
| AGSCO ® Sand #1 (silica sand) | 54.70 |
| Total: | 100.00 |

| Second Part (Hardener) | |
|---|---|
| Material | % By Weight |
| ANCAMINE ® 1856 (modified aliphatic amine) | 14.67 |
| ANCAMINE ® K54 (tertiary amine) | 1.73 |
| Talc 399 | 9.33 |
| AGSCO ® Sand #1 | 65.34 |
| Total: | 100.00 |

The inventive, highly viscous, essentially solid-phase rope adhesive, called EXP 220, was evaluated against two prior art epoxy-based liquid adhesives sold by ITW Ramset/Redhead under the names Granite 5 and Ceramic 6. The adhesives were evaluated using 0.5 in. diameter steel anchor rods, and 0.563 in.×4.5 in. boreholes formed in 4000 psi compressive strength concrete. The anchor rods had 1.5-degree tapered threads. The hand-operated driving tool was run at 1600 rpm.

Pullout strengths from dry concrete at ambient temperature were measured at various time intervals after insertion of the anchors, up to 24 hours. Pullout strengths were also measured for concrete which had been under water for 24 hours before and after insertion of the anchors. Pullout strengths were also measured for dry concrete which was maintained at 110° F. for 24 hours before and after insertion of the anchors. The pullout strengths, which are reported in pounds of force, were measured using an Instron load tester. Table 1 shows the pullout strengths resulting from these tests.

TABLE 1

Pullout Strengths (Pounds)

| Example No. | Adhesive | Dry Concrete, 4 Hours | Dry Concrete, 24 hours | Wet Concrete, 24 Hours | Dry Concrete, 110° F., 24 Hours |
|---|---|---|---|---|---|
| 1 | EXP 220 (Inventive) | 15,900 | 16,000 | 12,500 | 14,450 |
| 2 | Granite 5 (Comparative) | 5,900 | 15,700 | 12,500 | 8,500 |
| 3 | Ceramic 6 (Comparative) | 17,300 | 17,900 | 13,500 | 16,300 |

As shown above, the adhesive made and used according to the method of the invention produced an anchoring force higher than one of the prior art liquid epoxy adhesives, and equivalent to another.

In a second set of experiments performed under similar conditions at a different time and location, using similar 4000 psi concrete, the same inventive adhesive was tested using the same procedure, versus a) white epoxy putty sticks manufactured by Devcon Co. and sold by Ace Hardware Corp. and others, and b) HVU adhesive made and sold by Hilti AG of Waldstetlen, Germany. The white epoxy putty sticks are typically used for household applications and are not considered to be an anchoring adhesive. On information and belief, the HVU adhesive is similar to that described in U.S. Pat. No. 5,731,366, issued to Moench et al. The HVU adhesive contains a loose filler phase and a liquid chemical phase contained in capsules dispersed in the filler phase. Both phases are contained in a cylindrical plastic wrapper.

Table 2 shows the average holding strength for each of three adhesives, measured after 24 hours in dry, ambient temperature concrete.

TABLE 2

Pullout Strengths (Pounds)

| Example No. | Adhesive | Dry Concrete, 24 Hours |
| --- | --- | --- |
| 4 | EXP 220 (Inventive) | 12,291 |
| 5 | Devcon putty sticks (Comparative) | 5,382 |
| 6 | Hilti HVU (Comparative) | 12,538 |

As shown above, the adhesive made and used according to the method of the invention gave better holding force than the prior art putty sticks and similar holding force to the prior art fluid/capsule adhesive system.

While the embodiments of the invention described herein are presently preferred, various modifications and improvements can be made without departing from spirit and scope of the invention. The scope of the invention is indicated by the appended claims, and all changes that fall within the meaning and range of equivalents are intended to be embraced therein.

We claim:

1. A method of applying a chemical anchoring adhesive to the interior of a borehole, comprising the steps of:
    providing a slug of chemical anchoring adhesive including a first part and a second part joined at an interface extending a length of the slug;
    the first and second parts each having a viscosity of about 5 million to about 50 million centipoise at 25° C.;
    the first part comprising a resin and having a first color;
    the second part comprising a curing agent and having a second color different from the first color;
    inserting the slug into a borehole;
    providing an anchor pin; and
    driving the anchor pin into the borehole using a driving tool that imparts rotary motion to the anchor pin;
    whereupon the rotary motion of the anchor pin mixes the first and second parts together to form a composition having a third color different from the first and second colors.

2. The method of claim 1, wherein the first and second colors constitute natural colors of the first and second parts.

3. The method of claim 1, wherein at least one of the first and second parts further comprises a dye or pigment.

4. The method of claim 1, wherein the adhesive slug further comprises a wrapper.

5. The method of claim 4, wherein the wrapper comprises a plastic film.

6. The method of claim 4, wherein the wrapper comprises polyethylene.

7. The method of claim 4, wherein the wrapper comprises polypropylene.

8. The method of claim 1, wherein the anchor pin comprises a threaded shaft.

9. The method of claim 1, wherein the anchor pin comprises a flat end surface.

10. The method of claim 1, wherein the driving tool imparts the rotary motion at about 500–3000 rpm.

11. The method of claim 1, wherein the driving tool imparts the rotary motion at about 1000–2500 rpm.

12. The method of claim 1, wherein the driving tool imparts the rotary motion at about 1400–2000 rpm.

13. The method of claim 1, wherein the driving tool further imparts axial motion to the anchor pin.

14. The method of claim 1, wherein the adhesive slug has a length that corresponds substantially to a depth of the borehole.

15. A method of applying a chemical anchoring adhesive to the interior of a borehole, comprising the steps of:
    providing a rope of chemical anchoring adhesive including a first part and a second part joined at an interface extending a length of the rope;
    the first and second parts each having a viscosity of about 5 million to about 50 million centipoise at 25° C.;
    the first part comprising a resin and having a first color;
    the second part comprising a curing agent and having a second color different from the first color;
    inserting an end of the rope into the borehole;
    cutting the rope at an entrance to the borehole to yield an adhesive slug in the borehole;
    providing an anchor pin; and
    driving the anchor pin into the borehole using a driving tool that imparts rotary motion to the anchor pin;
    whereupon the rotary motion of the anchor pin mixes the first and second parts together to form a composition having a third color different from the first and second colors.

16. The method of claim 15, wherein the first and second parts are present in a ratio that is substantially consistent along the length of the rope.

17. The method of claim 15, wherein the rope further comprises a wrapper.

18. The method of claim 15, wherein the driving tool imparts the rotary motion at about 1000–2500 rpm.

19. The method of claim 15, wherein the driving tool further imparts axial motion to the anchor pin.

20. A method of applying a chemical anchoring adhesive to the interior of a borehole, comprising the steps of:
    providing a rope of chemical anchoring adhesive including a first part and a second part joined at an interface extending a length of the rope;
    the first and second parts each having a viscosity of about 5 million to about 50 million centipoise at 25° C.;
    the first part comprising a resin and having a first color;
    the second part comprising a curing agent and having a second color different from the first color;
    cutting the rope to yield an adhesive slug;
    inserting the slug into a borehole;
    providing an anchor pin; and
    driving the anchor pin into the borehole using a driving tool that imparts rotary motion to the anchor pin;
    whereupon the rotary motion of the anchor pin mixes the first and second parts together to form a composition having a third color different from-the first and second colors.

21. The method of claim 20, wherein the rope has a length to diameter ratio of at least about 10.

22. The method of claim 20, wherein the rope has a length to diameter ratio of at least about 15.

23. The method of claim 20, wherein the rope has a length to diameter ratio of at least about 20.

* * * * *